US008756512B2

(12) United States Patent
Bayang et al.

(10) Patent No.: US 8,756,512 B2
(45) Date of Patent: Jun. 17, 2014

(54) DYNAMIC GUI RENDERING BY AGGREGATION OF DEVICE CAPABILITIES

(75) Inventors: Josephine Faith Bayang, Tucson, AZ (US); Melissa Jorgette Garcia, Tucson, AZ (US); Kevan D. Holdaway, Tucson, AZ (US); Andrew Gary Hourselt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1606 days.

(21) Appl. No.: 11/746,462

(22) Filed: May 9, 2007

(65) Prior Publication Data

US 2008/0282172 A1 Nov. 13, 2008

(51) Int. Cl.
*G06F 3/00* (2006.01)

(52) U.S. Cl.
USPC ............ 715/745; 715/744; 715/746; 715/771

(58) Field of Classification Search
USPC ............. 715/771, 744, 745, 746; 75/771, 744
See application file for complete search history.

(56) References Cited

U.S. PATENT DOCUMENTS

| 6,476,828 | B1 | 11/2002 | Burkett et al. |
| 6,700,592 | B1 * | 3/2004 | Kou et al. ...................... 715/771 |
| 6,781,609 | B1 | 8/2004 | Barker et al. |
| 6,918,090 | B2 * | 7/2005 | Hesmer et al. ................ 715/760 |
| 7,076,543 | B1 | 7/2006 | Kirti et al. |
| 2002/0144233 | A1 * | 10/2002 | Chong et al. .................. 717/105 |
| 2003/0055948 | A1 | 3/2003 | Wang |
| 2003/0058277 | A1 * | 3/2003 | Bowman-Amuah .......... 345/765 |
| 2004/0215764 | A1 | 10/2004 | Allen et al. |
| 2005/0015713 | A1 | 1/2005 | Plastina et al. |
| 2005/0149676 | A1 * | 7/2005 | Shimada et al. .............. 711/114 |
| 2005/0154989 | A1 | 7/2005 | Maddocks et al. |

* cited by examiner

*Primary Examiner* — Andrey Belousov
(74) *Attorney, Agent, or Firm* — Konrad Raynes Davda & Victor LLP; Janaki K. Davda

(57) ABSTRACT

Provided are techniques for rendering a Graphical User Interface (GUI). A device capabilities set is obtained from a device. A rendering package that corresponds to the device capabilities set for the device is selected. The GUI is generated using the rendering package and the device capabilities set. The GUI is displayed to a user on a user interface to enable the user to manage the device.

24 Claims, 11 Drawing Sheets

```xml
<capabilitySet>
<volume elementClass="com.ibm.Volume" renderingClass="com.ibm.render.Volume" version="1.0">
    <actionSet>
       <action type="create"/>
       <action type="delete"/>
       <action type="list" modes="read,write"/>
       <action type="viewProperties" modes="read,write"/>
       <action type="defragment"/>
    </actionSet>
    <roles>
      <admin>
         <action type="all"/>
      </admin>
      <monitor>
         <action type="list" mode="read"/>
         <action type="viewProperties" mode="read"/>
      </monitor>
    </roles>
    <properties>
        <property name="size" dataType="integer" elementClass="java.lang.Integer" default="40" units="GB" mode="read,write"/>
        <property name="name" dataType="string" elementClass="java.lang.String" default="myvolume" mode="read,write"/>
        <property name="percentFree" dataType="percent" elementClass="java.lang.Integer" mode="read"/>
        <property name="mapped" dataType="boolean" elementClass="java.lang.Boolean" mode="read"/>
        <property name="state" dataType="string" elementClass="java.lang.String" default="normal" mode="read,write"/>
    </properties>
  </volume>
```

```
<pool elementClass="com.ibm.Pool" renderingClass="com.ibm.render.Pool" version="1.1">
    <actionSet>
        <action type="create"/>
        <action type="delete"/>
        <action type="list" modes="read,write"/>
        <action type="viewProperties" modes="read,write"/>
    </actionSet>
    <roles>
        <admin>
            <action type="all"/>
        </admin>
        <monitor>
            <action type="list" mode="read"/>
            <action type="viewProperties" mode="read"/>
        </monitor>
    </roles>
    <properties>
        <property name="size" dataType="integer" elementClass="java.lang.Integer" default="40" units="GB" mode="read,write"/>
        <property name="name" dataType="string" elementClass="java.lang.String" default="myvolume" mode="read,write"/>
        <property name="percentFree" dataType="percent" elementClass="java.lang.Integer" mode="read"/>
        <property name="volumes" dataType="list" sort="name" elementClass="com.ibm.Volume" mode="read,write"/>
        <property name="disks" dataType="list" sort="state" elementClass="com.ibm.Disk" filter="state=error,warning" mode="read"/>
        <property name="state" dataType="string" elementClass="java.lang.String" default="normal" mode="read,write"/>
    </properties>
</pool>
```

```
<disk elementClass="com.ibm.Disk" renderingClass="com.ibm.render.Disk" version="1.2">
  <actionSet>
    <action type="discover"/>
    <action type="list" modes="read"/>
    <action type="viewProperties" modes="read"/>
  </actionSet>
  <roles>
    <admin>
      <action type="all"/>
    </admin>
    <monitor>
      <action type="all"/>
    </monitor>
  </roles>
  <properties>
    <property name="size" dataType="integer" elementClass="java.lang.Integer" mode="read"/>
    <property name="percentFree" dataType="percent" elementClass="java.lang.String" mode="read"/>
    <property name="type" dataType="string" elementClass="com.ibm.String" mode="read"/>
    <property name="state" dataType="string" elementClass="java.lang.String" default="normal" mode="read"/>
  </properties>
</disk>
```

```
<maintanence elementClass="com.ibm.Maintanence"
renderingClass="com.ibm.render.Maintanence" version="1.1">
    <actionSet>
        <action type="list" modes="read,write"/>
        <action type="viewProperties" modes="read,write"/>
    </actionSet>
    <roles>
       <admin>
          <action type="all"/>
       </admin>
       <monitor>
          <action type="list" mode="read"/>
          <action type="viewProperties" mode="read"/>
       </monitor>
    </roles>
    <properties>
       <property name="volumes" dataType="list" sort="state"
elementClass="com.ibm.Volume" filter="state=error,warning" mode="read,write"/>
       <property name="pools" dataType="list" sort="state"
elementClass="com.ibm.Pool" filter="state=error,warning" mode="read,write"/>
    </properties>
  </maintanence>
<capabilitySet>
```

FIG. 5D

DYNAMIC GUI RENDERING BY AGGREGATION OF DEVICE CAPABILITIES

BACKGROUND

1. Field

Embodiments of the invention relate to dynamic Graphical User Interface (GUI) rendering by aggregation of device capabilities.

2. Description of the Related Art

Device specific Graphical User Interfaces (GUIs) are commonly used to manage devices (e.g., storage subsystems). This creates the problem of vendor lock and large code modifications to support new devices. Vendor lock may be described as a problem in which GUIs for a device relate specifically to one vendor that makes that device. Sometimes, it is desirable to be able to switch vendors of that device (i.e., provide a device from a different vendor) without exposing this transition to customers. When the GUIs are specific to a particular vendor, customers need to retrain to use this new device. This forces companies that provide the devices to maintain long term relationships with vendors in order to avoid disruption to customers.

Some systems use a Storage Management Initiative—Specification (SMI-S) component to manage multiple heterogeneous devices. SMI-S is a storage standard developed and maintained by the Storage Networking Industry Association (SNIA). SMI-S is directed to interoperability among heterogeneous devices.

While the problem of vendor lock may be solved by SMI-S, making large code modifications is problematic. Different devices have different capabilities and customer expectations. Device capabilities may be described as features of the device or functionality of the device (i.e., what the device can do). SMI-S provides the ability to add device specific functionality. Each device exposes capabilities that separate that device from other devices in the market place. Additionally, different devices have different customers with different needs. For example, an IBM® System Storage DS8000 system may have enterprise users who would like to understand the architecture in fine details. On the other hand, an IBM® TotalStorage DS400 system may have users who would prefer a level of detail that hides complicated concepts of storage architecture. The diversity of devices and users makes it difficult to write one GUI to manage multiple devices.

One solution is to write two separate GUIs for each of two different devices, with the two GUIs sitting on top of a common layer of code. Though this common layer of code saves some coding effort, more automation and structure are needed.

Also, when one GUI supports many devices, then every time a device is added, the GUI should be updated. Currently, this requires a new update for all devices.

Thus, there is a need in the art for dynamic GUI rendering by aggregation of device capabilities.

SUMMARY OF EMBODIMENTS OF THE INVENTION

Provided are a method, computer program product, and system for rendering a Graphical User Interface (GUI). A device capabilities set is obtained from a device. A rendering package that corresponds to the device capabilities set for the device is selected. The GUI is generated using the rendering package and the device capabilities set. The GUI is displayed to a user on a user interface to enable the user to manage the device.

BRIEF DESCRIPTION OF THE DRAWINGS

Referring now to the drawings in which like reference numbers represent corresponding parts throughout:

FIGS. 5A, 5B, 5C, and 5D illustrate a sample XML format that may be used for the capabilities in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1A:
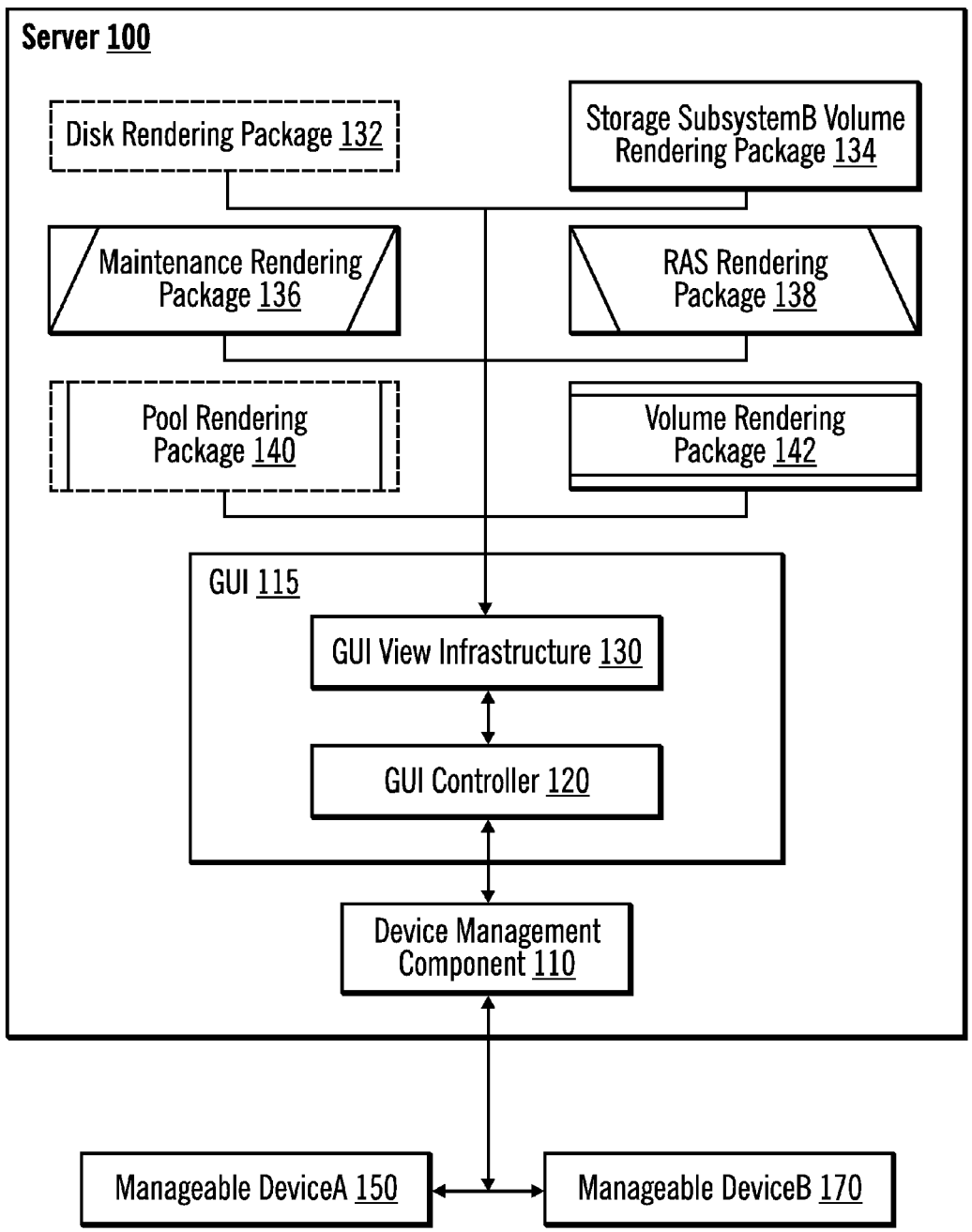
FIG. 1A illustrates details of a computing environment in accordance with certain embodiments.
Figure 1B:
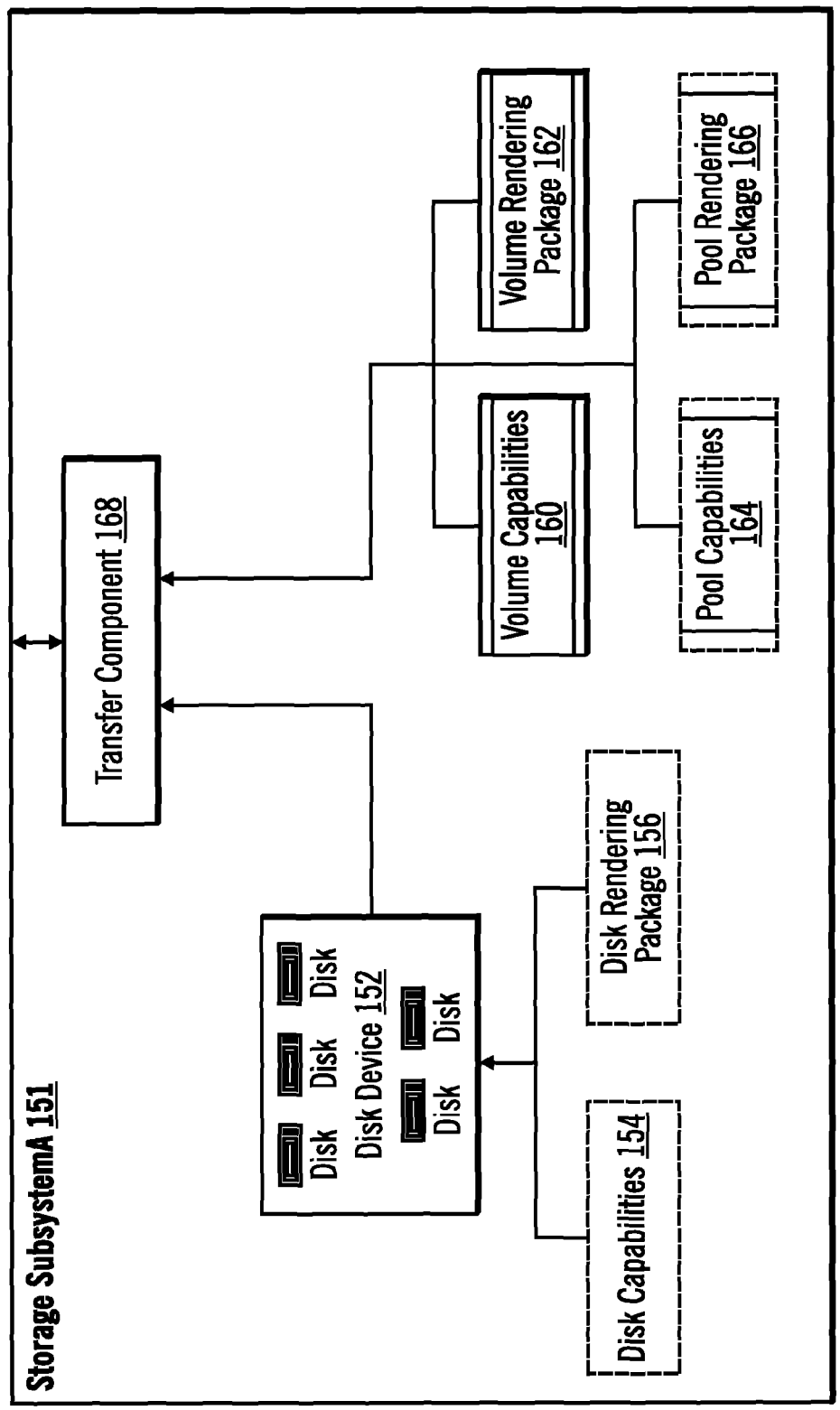
FIG. 1B illustrates a storage subsystemA in accordance with certain embodiments.
Figure 1C:
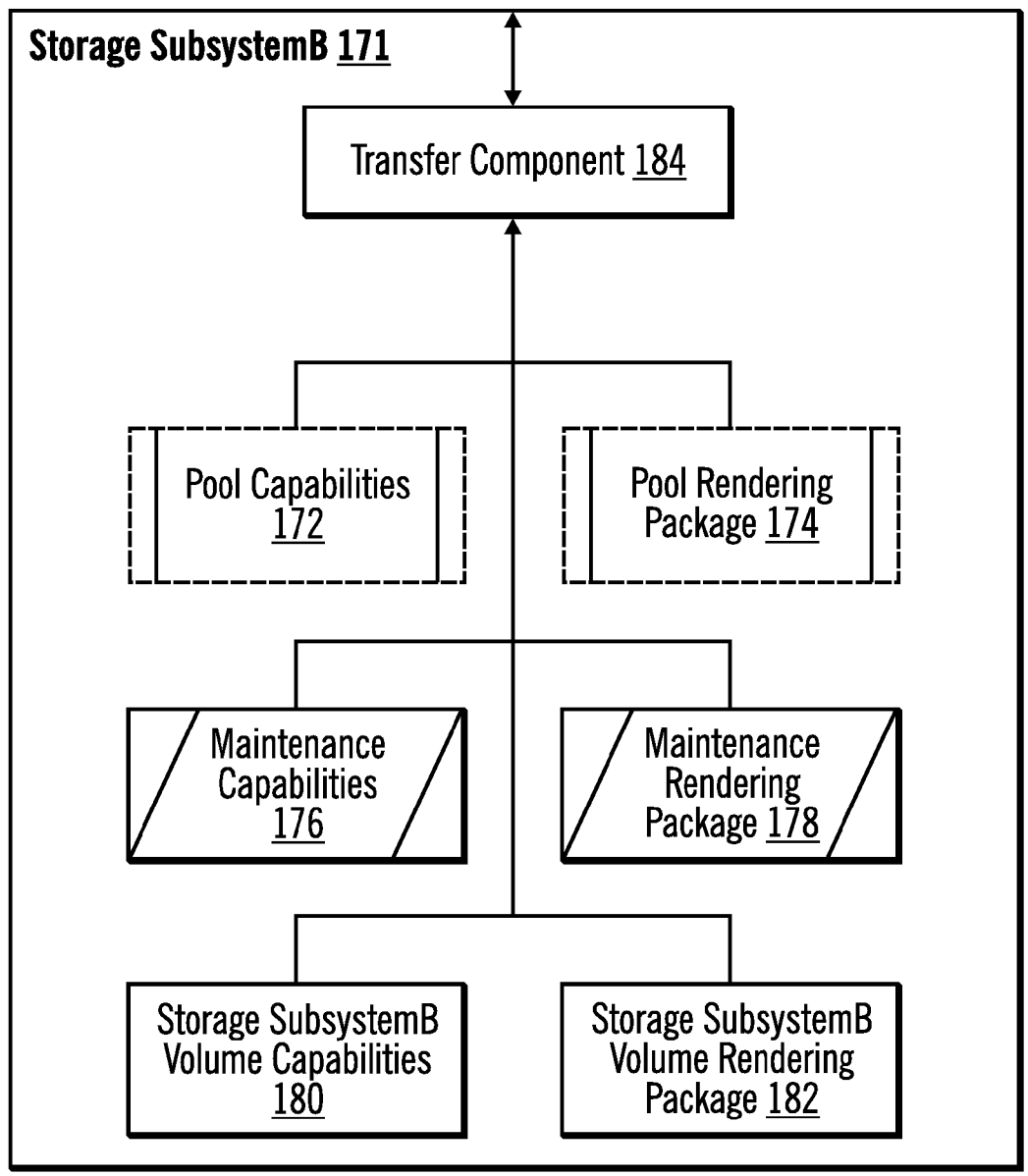
FIG. 1C illustrates a storage subsystemB in accordance with certain embodiments.

FIGS. 1A, 1B, and 1C (forming FIG. 1) illustrate details of a computing environment in accordance with certain embodiments. In FIG. 1A, a server 100 includes a device management component 110, GUI 115, and rendering packages 132-142. In certain embodiments, the server 100 includes generic rendering packages that may be used to generate GUIs for devices that do not provide rendering packages and capabilities. In certain embodiments, the capabilities are in an extensible Markup Language (XML) format.

The device management component 110 supports interoperability among heterogeneous devices. In certain embodiments, the device management component 110 is an SMI-S component. The device management component 110 is coupled to a GUI controller 120, which, in turn, is coupled to a GUI view infrastructure 130. The GUI controller 120 and GUI view infrastructure 130 may be said to form a GUI 115.

The GUI controller 120 obtains and maintains rendering packages. In the illustration of FIG. 1A, the GUI controller 120 maintains a disk rendering package 132, a storage subsystemB volume rendering package 134, a maintenance rendering package 136, an RAS rendering package 138, a pool rendering package 140, and a volume rendering package 142. The GUI view infrastructure 130 uses the rendering packages to render a GUI specific to a device based on the capabilities of the device. Also, the rendered GUI may be specific to a user and/or system state. That is the GUI may be user specific or system state specific. System state may be described as the state of the manageable device 150, 170. A pool may be described as a grouping of disks that have certain characteristics. In certain embodiments, the disks are formed into a RAID (Redundant Arrays of Inexpensive Disks). The RAID provides different services, such as redundancy, performance, etc. In certain embodiments, volumes may be described as consisting of extents of space taken from pools. In certain embodiments, a volume is a logical disk. The volume has no concept of where the physical disks are, and operating systems interact with a volume just as they would with a hard disk.

Server 100 is connected by a communication path to manageable device 150 and manageable device 170. To enhance understanding of embodiments, an example of manageable device 150 is provided in FIG. 1B, and an example of manageable device 170 is provided in FIG. 1C. FIG. 1B illustrates a storage subsystemA 151 in accordance with certain embodiments. FIG. 1C illustrates a storage subsystemB 171 in accordance with certain embodiments. In certain embodiments, storage subsystemA 151 is a Small and Medium-sized Business (SMB) device, and storage subsystemB 171 is an enterprise device.

Although storage devices are used herein as an example (FIGS. 1B, 1C), embodiments are applicable to any manageable devices. For example, embodiments are applicable to an iPod device, a printer, a computer, a networking device, a cell phone, etc. In certain embodiments, the functionality of server 100 is embedded on the device. Also, although disks are used here as examples of storage devices, storage device embodiments are applicable to any form of storage media (e.g., magnetic tape, CD-ROMs, and DVDs).

In FIG. 1B, storage subsystemA 151 includes a disk device 152 with disks, disk capabilities 154, and a disk rendering package 156. Storage subsystemA 151 also includes volume capabilities 160, a volume rendering package 162, pool capabilities 164, and a pool rendering package 166. In addition, the storage subsystemA 151 includes a transfer component 168, which obtains the capabilities 154, 160, 164 and rendering packages 156, 162, 166 and transmits them to the GUI controller 120. Thus, disk rendering package 132 is a copy of disk rendering package 156, volume rendering package 142 is a copy of volume rendering package 162, and pool rendering package 140 is a copy of pool rendering package 166.

In FIG. 1C, storage subsystemB 171 includes pool capabilities 172, a pool rendering package 174, maintenance capabilities 176, a maintenance rendering package 178, storage subsystemB volume capabilities 180, and a storage subsystemB volume rendering package 182. In addition, the storage subsystemB 171 includes a transfer component 184, which obtains the capabilities 172, 176, 180 and rendering packages 174, 178, 182 and transmits them to the GUI controller 120. Thus, pool rendering package 140 is a copy of pool rendering package 174, maintenance rendering package 134 is a copy of maintenance rendering package 178, and storage subsystemB volume rendering package 136 is a copy of storage subsystemB volume rendering package 182. In certain embodiments, the RAS rendering package 138 is a default rendering package that ships with GUI view infrastructure 130, but that no devices are currently using.

The server 100 and manageable devices 150, 170 may each comprise any computing device known in the art, such as a server, mainframe, workstation, personal computer, hand held computer, laptop telephony device, network appliance, etc.

The server 100 and manageable devices 150, 170 may communicate via any type of communication paths, such as any type of network; for example, a peer-to-peer network, spoke and hub network, Storage Area Network (SAN), a Local Area Network (LAN), Wide Area Network (WAN), the Internet, an Intranet, etc.

Figure 2:
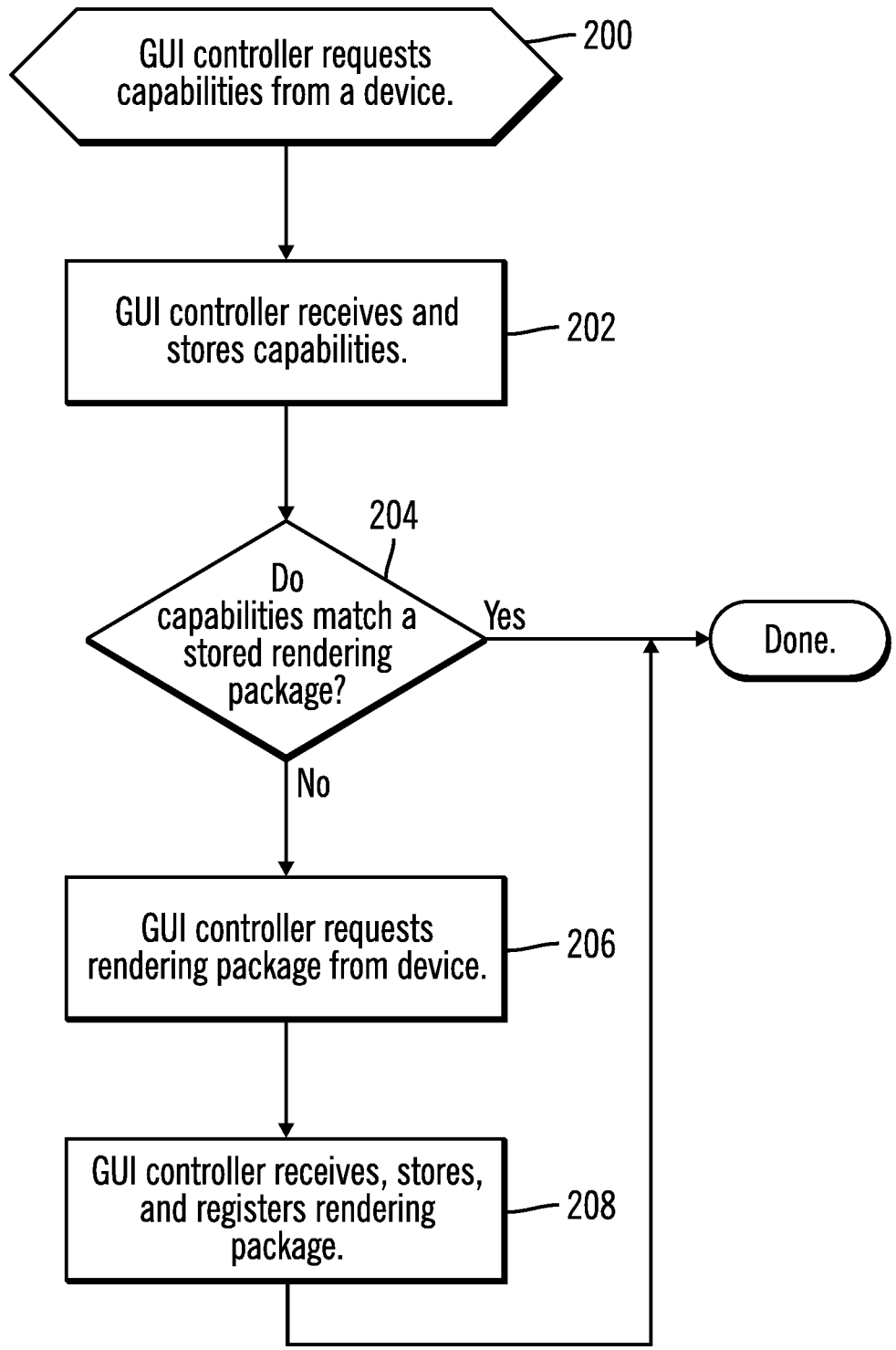
FIG. 2 illustrates logic performed by a GUI controller for each device in accordance with certain embodiments.

FIG. 2 illustrates logic performed by GUI controller 120 for each device in accordance with certain embodiments. Control begins at block 200 with the GUI controller 120 requesting capabilities from a device (e.g., manageable device 150, 170). In certain embodiments, the capabilities are in the form of a device capabilities set. In block 202, the GUI controller 120 receives and stores the capabilities from the device.

The GUI controller 120 maintains (e.g., stores) different rendering packages for each group of capabilities that it is aware of. If the device provides capabilities that are not recognized by the GUI controller 120, the GUI controller 120 queries the device for the rendering package associated with the received capabilities. Thus, in block 204, the GUI controller 120 determines whether the received capabilities match a stored rendering package. If so, processing is done for this device, otherwise, processing continues to block 206. In block 206, the GUI controller 120 requests a rendering package from the device. In block 208, the GUI controller 120 receives, stores, and registers the rendering package. In certain embodiments, the GUI controller 120 registers the rendering package and caches the rendering package for future use.

Thus, in the processing of blocks 206-208, the device transfers a new rendering package to the GUI controller 120.

Figure 3:
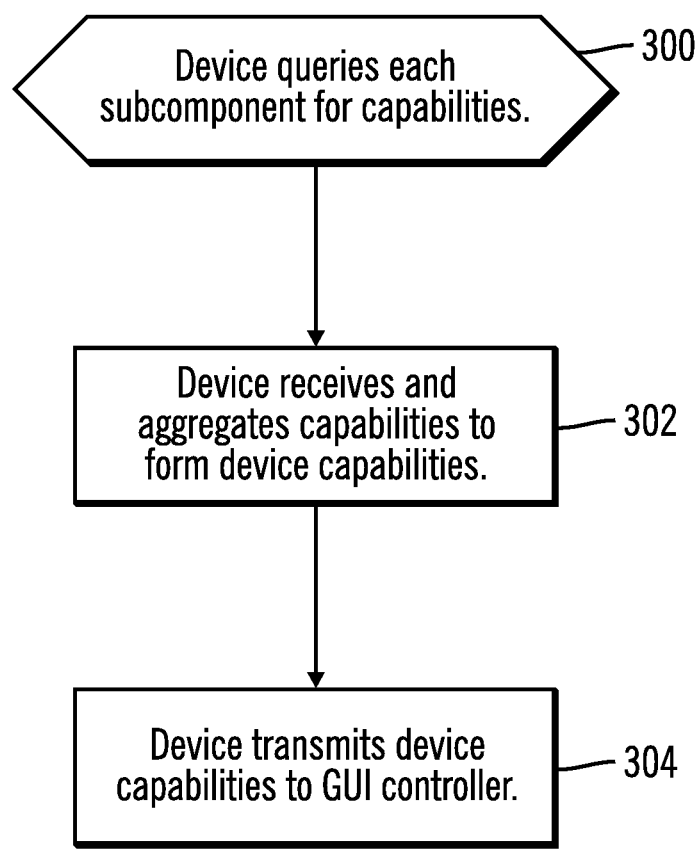
FIG. 3 illustrates logic performed by a device in accordance with certain embodiments.

FIG. 3 illustrates logic performed by a device in accordance with certain embodiments. Control begins at block 300 with a device querying each subcomponent for capabilities. In block 302, the device (e.g., manageable device 150, 170) aggregates the received capabilities of subcomponents to form device capabilities. In block 304, the storage system transmits the device capabilities to the GUI controller 120 in response to a request for capabilities from the GUI controller 120.

Thus, in certain embodiments, each device (e.g., manageable device 150, 170) provides the GUI controller 120 with information about its capabilities. If a device has subcomponents, the device aggregates the capabilities of the subcomponents into a package that is then passed to the GUI controller 120. The GUI controller 120 then renders the capabilities. Thus, embodiments shift the focus of GUI coding from writing pages specific to a device to writing pages specific to a logical or physical component (i.e., subcomponents). Examples of subcomponents include disks, network cards, memory chips, processors, and controllers. Other examples of subcomponents include higher level components, such as computers, servers, or clusters. A cluster may be described as a logical computer consisting of many smaller computers (e.g., servers), and the cluster could aggregate the capabilities of the computers (e.g., servers) that it contains.

As an example, the disk capabilities 154 may be stored on the disk device 152. Storage subsystemA 151 queries its subcomponents (e.g., the disk device 152) and aggregates the capabilities (provided as XML in certain embodiments) of the subcomponents with other capabilities (e.g., capabilities 160 and 164) to form device capabilities (e.g., in XML). That is, the storage subsystemA 151 aggregates the capabilities and passes the device capabilities to the GUI controller 120. This componentized breakdown allows each device to focus on its own capabilities.

In certain embodiments, each rendering package runs the device capabilities in XML through validation using XML schemas after the GUI controller 120 receives the device capabilities and before they are passed on to the GUI view infrastructure 130 for rendering. In certain embodiments, the validation process validates that the XML is in a known format for this rendering package and it proceeds to generate HyperText Markup Language (HTML)/JavaScript® text using JavaServer Pages® (JSP)/Servlets.

Figure 4:
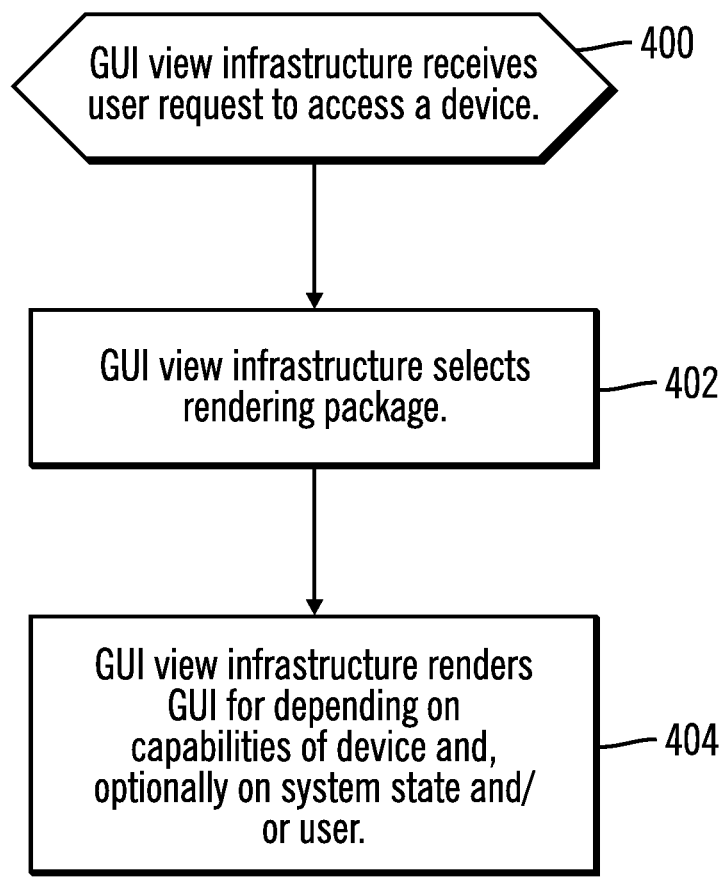
FIG. 4 illustrates logic performed by a GUI view infrastructure in accordance with certain embodiments.

FIG. 4 illustrates logic performed by the GUI view infrastructure 130 in accordance with certain embodiments. Control begins at block 400 with the GUI view infrastructure 130 receiving a user request to access a device. In block 402, the GUI view infrastructure 130 selects a rendering package for the device. In block 404, the GUI view infrastructure renders a GUI for the device depending on the capabilities of the device and, optionally, on system state and/or the user making the request to enable a user to manage the device. Thus, rendering may be described as a process of taking backend metadata and transforming that metadata into a GUI that can be viewed by a user. For example, the GUI may be represented as a web page.

Thus, the GUI view infrastructure 130 renders the capabilities and knows at runtime what capabilities each of the devices supports. Such capabilities may change within the same device when users with different user roles use the GUI. Additionally, updates to the GUI are shipped with the device, and the device automatically updates capabilities with the GUI controller 120. Thus, the GUI view infrastructure 130 is not updated as frequently as devices are updated.

In certain embodiments, the device capabilities are described by a device capabilities set (e.g., file) and specifies the following: a rendering package that is capable of rendering the capabilities; zero or more actions that may be performed; zero or more roles and associated actions that correspond to each role; and, a list of zero or more properties that are used for the actions. Each device capabilities set may also include other items not specified herein. For example, each device capabilities set may include additional items that allow the GUI view infrastructure 130 to render the GUI using device capabilities.

Examples of actions include: create, delete, modify, and view (i.e., view data). With reference to the roles and associated actions, the capabilities may restrict the permissions on a role. For example, a viewProperties role may allow a user to modify objects, and this may be restricted through role constraints. With reference to the list of properties, if an action permits writing or modifying, a property may specify a default value. A default value may also be used with read only permissions, and this indicates that the user cannot change the value but can see the value.

FIGS. 5A, 5B, 5C, and 5D illustrate a sample XML format 500, 510, 520, 530 that may used for the capabilities in accordance with certain embodiments. The XML format is used to provide a rendering package with a list of capabilities and relationships (as the properties themselves can be complex objects, such as volumes or pools).

In FIG. 5A, the XML format 500 indicates that this is a capability set with the beginning element "<capabilitySet>". An element class ("elementClass") identifies a logical or physical component (e.g., a disk, pool, volume, or maintenance). A rendering class ("renderingClass") identifies a rendering package. "Version" identifies a version level. In certain embodiments, the GUI controller 120 recognizes that the rendering package is not a registered rendering package (e.g., one that is stored at server 100) by checking the rendering class and version number. If either the rendering class libraries are not found or the version number of a stored rendering package is lower, the GUI controller 120 requests a new rendering package from the device.

In certain embodiments, when the GUI controller 120 receives capabilities from a device, the GUI controller 120 compares the rendering class and version number identified by the capabilities with stored rendering packages to determine whether there is a match (block 204).

In FIG. 5A, the XML format 500 specifies a volume elementClass and a rendering class. For the volume, the XML format 500 specifies an action set ("<actionSet>") that defines the actions create, delete, list, viewProperties, and defragment. For the volume, the XML format 500 specifies roles ("<roles>") of admin and monitor, each with its own actions (e.g., the admin role has all actions, while the monitor role has the list and viewProperties actions). For the volume, the XML format 500 also specifies properties ("<properties>") with some default values.

In FIG. 5B, the XML format 510 specifies a pool elementClass and a rendering class. For the pool, the XML format 510 specifies an action set, roles, and properties. In FIG. 5C, the XML format 520 specifies a disk element class and a rendering class. For the disk, the XML format 520 specifies an action set, roles, and properties. In FIG. 5D, the XML format 530 specifies a maintenance elementClass and a renderingClass. For the maintenance class, the XML format 530 specifies an action set, roles, and properties.

A rendering package for the example capabilities of FIGS. 5A-5D would be execution code that renders a GUI using the capabilities. The rendering package may be described as a set of code that as input takes capabilities and as output produces a GUI. For example, if the GUI were a web page, the rendering package would output HTML. As another example, if the GUI were being generated by a JAVA® application, the rendering package would output a GUI using the native GUI components of the JAVA® language. As yet another example, if the GUI were being generated by the C programming language, the rendering package would generate native calls to an operating system.

With embodiments, it is possible for a rendering package for a device to support properties that the device does not support. If the device does not support a specific property, the GUI view infrastructure 130 uses the logic of the rendering package to construct a GUI that does not expose this property. Also, the GUI view infrastructure 130 uses the logic of the rendering package to determine how to supply values for properties that are suppressed by the device (e.g., by supplying default configurations).

Thus, a programmer for a new device can leverage any existing rendering packages by producing XML in the known format. A programmer for the device can also expand the rendering packages by writing a new one.

The XML provides a clean interface between the GUI 115 and the device. If a rendering package is updated, all devices using the rendering package automatically receive the new look and feel of the GUI without any separate code modifications. Likewise, a programmer of the device may choose to hide/expose capabilities by simply modifying the XML. Although XML is used herein as an example, any language may be used.

Thus, embodiments divide the task of rendering the GUI. The GUI controller 120 manages retrieving and maintaining rendering packages and capability sets. The GUI view infrastructure 130 combines views that are rendered into a single GUI that is displayed on a user interface (e.g., a computer monitor) to a user. A view may be described as the graphical portion of a GUI that a user interacts with (e.g. a web page or application that produces graphical content). Thus, the GUI view infrastructure 130 provides several components. For example, for a Microsoft® Word application, the view would be a Word document. Also, with the view of the Word document, there is a tool bar at the top and other icons at the bottom of the view. The Word document also has content that a user is actively typing in. Using this example, the GUI view infrastructure 130 provides the tool bars, and the rendering package provides the main content area (where the user types input). While these come from two different sources, they appear as one application GUI to the user.

Each device (e.g., manageable devices 150, 170) manages the capabilities and the rendering packages it supports. The capabilities may change depending on the system state or the user using the GUI. As an example of system state, it may be that the system can not accept an action anymore. For example, if an entire storage system is filled, create actions may no longer be a feature that is supported until the user deletes volumes.

IBM is a registered trademark or common law mark of International Business Machines Corporation in the United States and/or other countries. JAVA, JavaScript and JavaServer Pages are registered trademarks or common law marks of Sun Microsystems in the United States and/or other countries. Microsoft is a registered trademark or common law mark of Microsoft Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3 and 4 describes specific operations occurring in a particular order. In alternative embodiments, certain logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3 and 4 may be implemented in software, hardware, programmable and non-programmable gate array logic or in some combination of hardware, software, or gate array logic.

Figure 6:
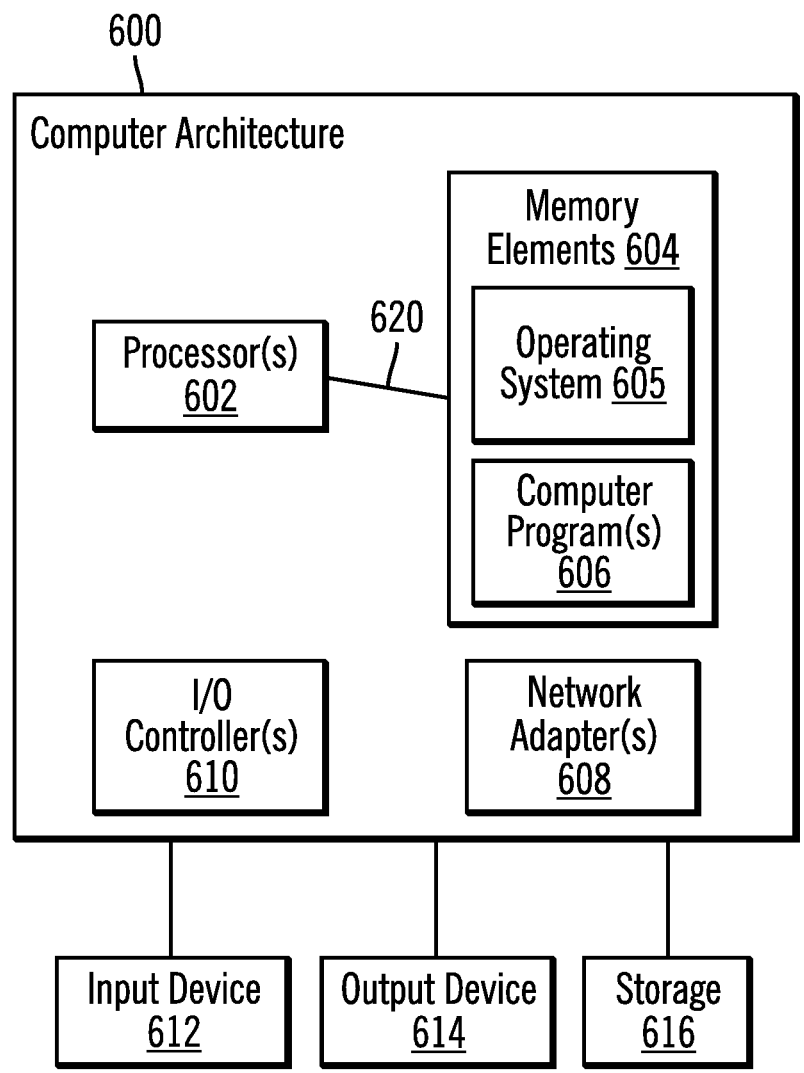
FIG. 6 illustrates a system architecture that may be used in accordance with certain embodiments.

FIG. 6 illustrates a system architecture 600 that may be used in accordance with certain embodiments. Server 100, manageable device 150 and/or manageable device 170 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modems and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for rendering a Graphical User Interface (GUI), comprising:
   obtaining, with a processor of a computer, a device capabilities set for a device that identifies a rendering package that is used to render capabilities in the GUI, that identifies actions that are used to manage the device, that identifies two or more roles of a user and a different set of the actions that correspond to each of the roles, and that identifies properties that are used for the actions; and
   in response to a request to access the device from the user, selecting the rendering package that corresponds to the device capabilities set for the device by:
      determining whether the rendering package identified in the device capabilities set matches a stored rendering package by comparing a rendering class and a version identified by the device capabilities set with each stored rendering package;
      in response to determining that the rendering package identified in the device capabilities set matches a stored rendering package, selecting the stored rendering package; and
      in response to determining that the rendering package identified in the device capabilities set does not match a stored rendering package, requesting the rendering package from the device;
      generating the GUI using the rendering package and the device capabilities set that is specific to a role from the identified two or more roles of the user using the GUI; and
      displaying the GUI to the user on a user interface to enable the user to manage the device by performing the different set of the actions that correspond to the role.

2. The method of claim 1, wherein the device capabilities set identifies one of a logical subcomponent and a physical subcomponent and identifies a rendering class.

3. The method of claim 1, further comprising:
   receiving an updated rendering package corresponding to the selected rendering package from the device; and
   displaying the GUI using the updated rendering package.

4. The method of claim 3, wherein the device queries each subcomponent for capabilities and aggregates the capabilities to form the device capabilities set.

5. The method of claim 1, further comprising:
   generating the GUI using the rendering package and the device capabilities set based on a system state of the device that indicates actions that the device no longer accepts but that are available in the device capabilities set.

6. A computer-implemented method for rendering a Graphical User Interface (GUI), comprising:
   obtaining, with a processor of a computer, device capabilities from each of multiple devices, wherein each of the multiple devices aggregates capabilities of each subcomponent to form the device capabilities;
   obtaining a rendering package that corresponds to the device capabilities of each of the multiple devices by:
      determining whether the rendering package identified in the device capabilities for a device from the multiple devices matches any stored rendering package by comparing a rendering class and a version identified by the device capabilities with each stored rendering package;
      in response to determining that the rendering package identified in the device capabilities set does match, selecting a stored rendering package; and
      in response to determining that the rendering package identified in the device capabilities set does not match, obtaining the rendering package from the device;
   in response to a user having a role selected from multiple roles defined in the device capabilities requesting a GUI for a specific device from the multiple devices, generating the GUI for the specific device and the role using the rendering package and the device capabilities for the specific device, wherein the role is associated with actions that the user having that role can perform using the GUI;
   displaying the GUI to a user on a user interface;
   receiving a new rendering package corresponding to the obtained rendering package for the specific device; and
   displaying the GUI using the new rendering package.

7. The method of claim 6, wherein the GUI is system state specific and user specific.

8. A computer program product comprising a computer-readable medium including a computer readable program, wherein the computer readable program when executed by a processor on a computer causes the computer to:
   obtain a device capabilities set for a device that identifies a rendering package that is used to render capabilities in the GUI, that identifies actions that are used to manage the device, that identifies two or more roles of a user and a different set of the actions that correspond to each of the, and that identifies properties that are used for the actions; and
   in response to a request to access the device from the user, select the rendering package that corresponds to the device capabilities set for the device by:
      determining whether the rendering package identified in the device capabilities set matches a stored rendering package by comparing a rendering class and a version identified by the device capabilities set with each stored rendering package;
      in response to determining that the rendering package identified in the device capabilities set matches a stored rendering package, selecting the stored rendering package; and in response to determining that the rendering package identified in the device capabilities set does not match a stored rendering package, requesting the rendering package from the device;

generate the GUI using the rendering package and the device capabilities set that is specific to a role from the identified two or more roles of the user using the GUI; and display the GUI to the user on a user interface to enable the user to manage the device by performing the different set of actions that correspond to the role.

9. The computer program product of claim 8, wherein the device capabilities set identifies one of a logical subcomponent and a physical subcomponent and identifies a rendering class.

10. The computer program product of claim 8, wherein the computer readable program when executed on a computer causes the computer to:

receive an updated rendering package corresponding to the selected rendering package from the device; and display the GUI using the updated rendering package.

11. The computer program product of claim 10, wherein the device queries each subcomponent for capabilities and aggregates the capabilities to form the device capabilities set.

12. The computer program product of claim 8, wherein the computer readable program when executed on a computer causes the computer to:

generate the GUI using the rendering package and the device capabilities set based on a system state of the device that indicates actions that the device no longer accepts but that are available in the device capabilities set.

13. A computer program product comprising a computer useable medium including a computer readable program, wherein the computer readable program when executed on a computer causes the computer to:

obtain device capabilities from each of multiple devices, wherein each of the multiple devices aggregates capabilities of each subcomponent to form the device capabilities;

obtain a rendering package that corresponds to the device capabilities of each of the multiple devices by:

determining whether the rendering package identified in the device capabilities for a device from the multiple devices matches any stored rendering package by comparing a rendering class and a version identified by the device capabilities with each stored rendering package;

in response to determining that the rendering package identified in the device capabilities set does match, selecting a stored rendering package; and in response to determining that the rendering package identified in the device capabilities set does not match, obtaining the rendering package from the device;

in response to a user having a role selected from multiple roles defined in the device capabilities requesting a GUI for a specific device from the multiple devices, generate the GUI for the specific device and the role using the rendering package and the device capabilities for the specific device, wherein the role is associated with actions that the user having that role can perform using the GUI;

display the GUI to a user on a user interface;

receive a new rendering package corresponding to the obtained rendering package for the specific device; and display the GUI using the new rendering package.

14. The computer program product of claim 13, wherein the GUI is system state specific and user specific.

15. A system for rendering a Graphical User Interface (GUI), comprising:

a processor; and storage coupled to the processor, wherein the storage stores a computer program, and wherein the processor executes the computer program to perform operations, wherein the operations comprise:

obtaining a device capabilities set for a device that identifies a rendering package that is used to render capabilities in the GUI, that identifies actions that are used to manage the device, that identifies two or more roles of a user and a different set of the actions that correspond to each of the roles, and that identifies properties that are used for the actions; and in response to a request to access the device from the user, selecting the rendering package that corresponds to the device capabilities set for the device by:

determining whether the rendering package identified in the device capabilities set matches a stored rendering package by comparing a rendering class and a version identified by the device capabilities set with each stored rendering package;

in response to determining that the rendering package identified in the device capabilities set matches a stored rendering package, selecting the stored rendering package; and in response to determining that the rendering package identified in the device capabilities set does not match a stored rendering package, requesting the rendering package from the device;

generating the GUI using the rendering package and the device capabilities set that is specific to a role from the identified two or more roles of the user using the GUI; and displaying the GUI to the user on a user interface to enable the user to manage the device by performing the different set of the actions that correspond to the role.

16. The system of claim 15, wherein the device capabilities set identifies one of a logical subcomponent and a physical subcomponent and identifies a rendering class.

17. The system of claim 15, further comprising:

receiving an updated rendering package corresponding to the selected rendering package from the device; and displaying the GUI using the updated rendering package.

18. The system of claim 17, wherein the device queries each subcomponent for capabilities and aggregates the capabilities to form the device capabilities set.

19. The system of claim 15, further comprising:

generating the GUI using the rendering package and the device capabilities set based on a system state of the device that indicates actions that the device no longer accepts but that are available in the device capabilities set.

20. A system for rendering a Graphical User Interface (GUI), comprising:

a processor; and storage coupled to the processor, wherein the storage stores a computer program, and wherein the processor executes the computer program to perform operations, wherein the operations comprise:

obtaining device capabilities from each of multiple devices, wherein each of the multiple devices aggregates capabilities of each subcomponent to form the device capabilities;

obtaining a rendering package that corresponds to the device capabilities of each of the multiple devices by:

determining whether the rendering package identified in the device capabilities for a device from the multiple devices matches any stored rendering package by comparing a rendering class and a version identified by the device capabilities with each stored rendering package;

in response to determining that the rendering package identified in the device capabilities set does match, selecting a stored rendering package; and in response to determining that the rendering package identified in the device capabilities set does not match, obtaining the rendering package from the device;

in response to a user having a role selected from multiple roles defined in the device capabilities requesting a GUI for a specific device from the multiple devices, generating the GUI for the specific device and the role using the rendering package and the device capabilities for the specific device, wherein the role is associated with actions that the user having that role can perform using the GUI; and displaying the GUI to a user on a user interface;

receiving a new rendering package corresponding to the obtained rendering package for the specific device; and displaying the GUI using the new rendering package.

21. The system of claim 20, wherein the GUI is system state specific and user specific.

22. The method of claim 1, further comprising:

in response to determining that the device does not have a device capabilities set and a rendering package, using a generic rendering package to generate the GUI.

23. The computer program product of claim 8, wherein the computer readable program when executed on a computer causes the computer to:

in response to determining that the device does not have a device capabilities set and a rendering package, use a generic rendering package to generate the GUI.

24. The system of claim 15, further comprising:

in response to determining that the device does not have a device capabilities set and a rendering package, use a generic rendering package to generate the GUI.

* * * * *